(12) United States Patent
Kowalyshen et al.

(10) Patent No.: US 8,272,127 B2
(45) Date of Patent: Sep. 25, 2012

(54) METHOD OF MAKING A CIRCUIT INTERRUPTING DEVICE

(75) Inventors: Henry W. Kowalyshen, Niles, IL (US); Joseph P. Moniski, Arlington Heights, IL (US)

(73) Assignee: S&C Electric Company, Chicago, IL (US)

( * ) Notice: Subject to any disclaimer, the term of this patent is extended or adjusted under 35 U.S.C. 154(b) by 175 days.

(21) Appl. No.: 12/887,315

(22) Filed: Sep. 21, 2010

(65) Prior Publication Data

US 2011/0227252 A1   Sep. 22, 2011

Related U.S. Application Data

(62) Division of application No. 12/091,339, filed as application No. PCT/US2006/038471 on Oct. 3, 2006, now Pat. No. 7,820,926.

(60) Provisional application No. 60/731,312, filed on Oct. 28, 2005, provisional application No. 60/732,513, filed on Nov. 2, 2005.

(51) Int. Cl.
*H01K 3/22* (2006.01)

(52) U.S. Cl. ................ 29/848; 29/622; 29/874

(58) Field of Classification Search .................... 29/848, 29/622, 825, 846, 874; 200/48 R, 48 KB; 218/58, 65, 68; 337/159, 186, 202, 246, 337/248
See application file for complete search history.

(56) References Cited

U.S. PATENT DOCUMENTS

| 3,641,295 | A | * | 2/1972 | Ferton et al. | 218/58 |
| 3,955,167 | A | | 5/1976 | Kumbera | |
| 4,135,174 | A | * | 1/1979 | Biller | 337/186 |

FOREIGN PATENT DOCUMENTS

EP      1107409 A1   6/2001

* cited by examiner

*Primary Examiner* — Thiem Phan

(57) ABSTRACT

A circuit interrupting device is manufacturable in a number of different configurations providing current path options, conductor connectivity options and sensing options. The device may include a configurable solid insulation housing into which various operable components are installed. The device may include a core element including a sensor assembly and conductor members, from which the various configurations may be established including a plurality of different current path configurations. A plurality of circuit interrupting devices may be configured together in an assembly with corresponding disconnect assemblies. An interlock is provided to prevent operation of the disconnect assemblies unless the circuit interrupting devices are in an open state.

10 Claims, 15 Drawing Sheets

METHOD OF MAKING A CIRCUIT INTERRUPTING DEVICE

CROSS-REFERENCE TO RELATED APPLICATIONS

This patent is a division of U.S. patent application Ser. No. 12/091,339, filed Apr. 24, 2008 entitled Circuit Interrupter Assembly and Method of Making the Same, the disclosure of which is hereby expressly incorporated herein by reference for all purposes.

TECHNICAL FIELD

This patent relates to a circuit interrupting device that may be manufactured in a number of different configurations and a method of making such a circuit interrupting device.

BACKGROUND

Circuit interrupting devices function to isolate a fault condition in a power distribution system. Upon clearing of the fault condition certain types of these devices may be manually or automatically reclosed to restore the circuit. Faults in a power distribution system can occur for any number of reasons and are typically transient. Detection and isolation of the fault mitigates damage to the system as a result of the fault. Reclosing after the fault is cleared provides for quick service restoration.

DETAILED DESCRIPTION

A circuit interrupting device is manufacturable in a number of different configurations providing current path options, conductor connectivity options and sensing options. The device may include a configurable solid insulation housing into which various operable components are installed. The device may include a core element including a sensor assembly and conductor members, from which the various configurations may be established including a plurality of different current path configurations. The core may be molded in situ within the solid insulation housing. Based upon the final configuration of the circuit interrupting device, the solid insulating housing is molded with various housing options. Operable elements, such as vacuum interrupters, actuators, and the like may be disposed within the housing. More than one circuit interrupting device may be provided in a structure for connection in multiphase power distribution systems.

A method of providing a circuit interrupting device includes providing in situ molding of a core member within a solid insulation housing. Mold sections permits molding of the solid insulating housing in a number of different configurations and to include a number of different current path options.

While the invention is described in terms of several preferred embodiments of circuit interrupting devices, it will be appreciated that the invention is not limited to circuit interrupting devices. The inventive concepts may be employed in connection with any number of devices including circuit breakers, reclosers, sensors, and the like.

Figure 1:
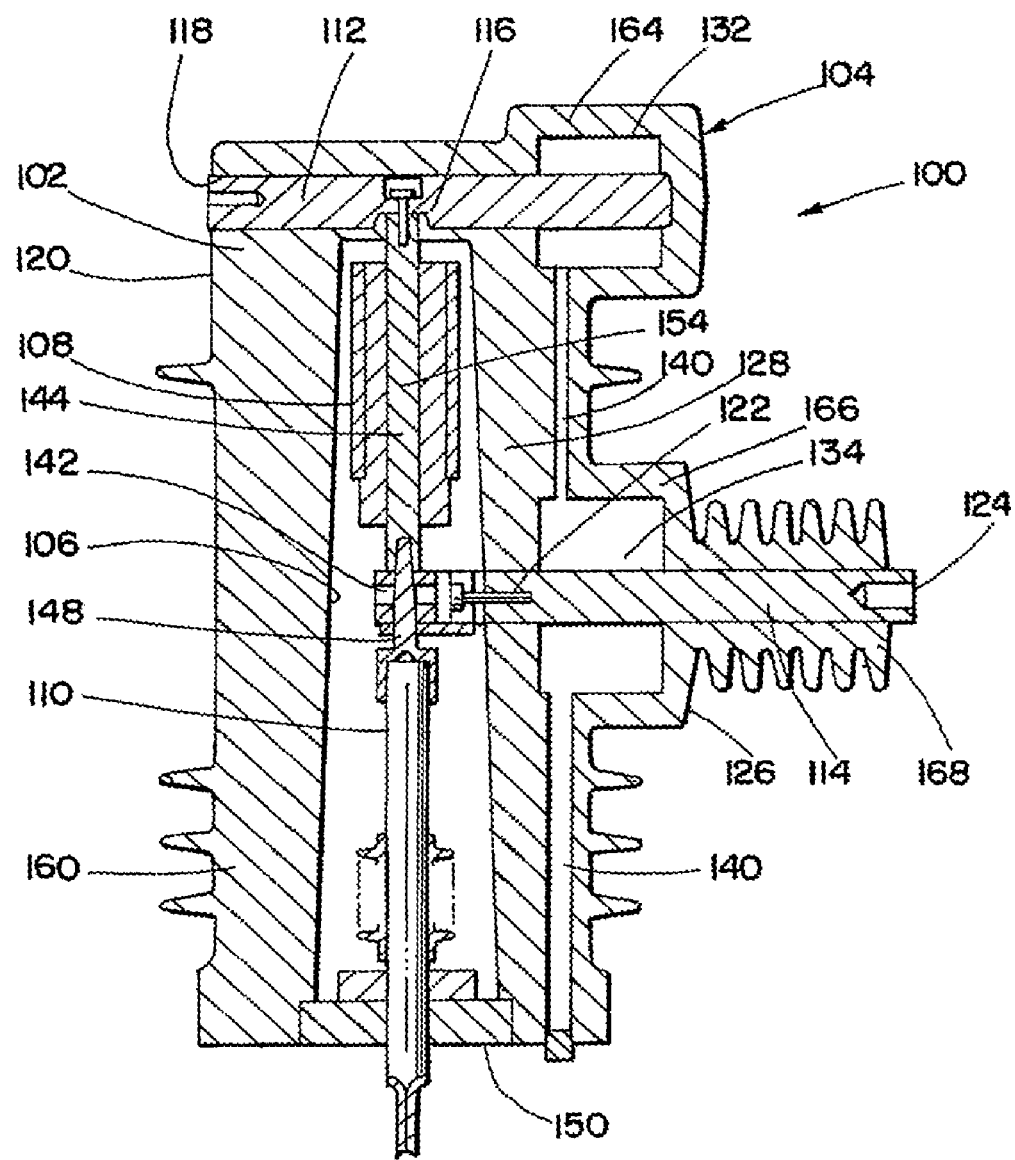
FIG. 1 is a cross-sectional view of a circuit interrupting device.

FIG. 1 illustrates an embodiment of the invention as a circuit interrupting device 100. The circuit interrupting device 100 includes a solid insulation housing 102 within which a core 104 is molded. The solid insulation housing 102 is further molded with a cavity 106 into which there is disposed a fault interrupter such as a vacuum interrupter 108 coupled to an insulated actuating rod 110. The vacuum interrupter 108 couples a first conductor 112 to a second conductor 114. Other fault interrupters capable of interrupting the current path within an sealed enclosure and providing arc control and/or arc suppression may be used.

The first conductor 112 may be a conductive rod including a first tap 116 for coupling to the vacuum interrupter 108 and a second tap 118 for coupling externally of the housing 102 on a first external side 120 of the housing 102. The second conductor 114 may also be a conductive rod that includes a first tap 122 for coupling to the vacuum interrupter 108 and a second tap 124 for coupling externally of the housing 102 on a second external side 126 of the housing 102. The first conductor 112, the circuit interrupter 108 and the second conductor 114 define a current path 128 through the device 100.

As shown in FIG. 1, the current path 128 may have a "Z" shaped configuration. Relative to FIG. 1, and for illustrative purposes only, the first conduct 112 extends horizontally and is disposed relatively above the second conductor 114, which also extends horizontally within the housing 102. The second conductor 114 is generally parallel to the first conductor 112. The vacuum interrupter 108 extends vertically between the first conductor 112 and the second conductor 114 defining the "Z" shaped current path 128 from the first external side 120 of the housing 102 to the second external side 126. One will appreciate that the "Z" shaped current path 126 is as depicted in FIG. 1, and that rotating the device may result in an "N" shaped current path, or other similar "zig zag" type arrangements. Still other current paths may be provided where the current path includes a first current tap on a first side of the device and a second current tap on a second side of the device, different than the first side of the device.

Figure 2:
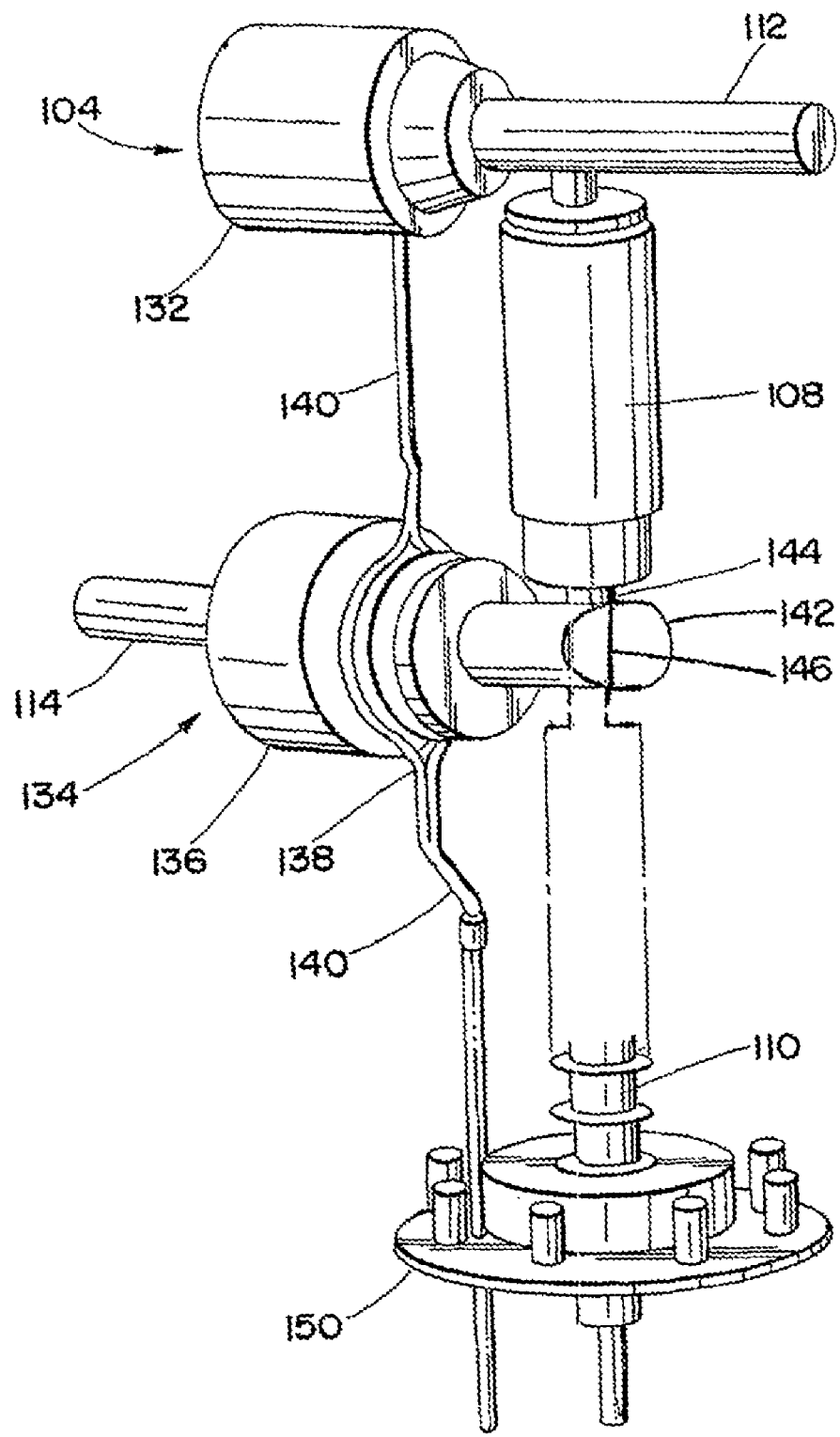
FIG. 2 is a perspective view of a conductor/sensor subassembly of the circuit interrupting device illustrated in FIG. 1.

With continued reference to FIG. 1 and reference now also to FIG. 2, the first conductor 112 and the second conductor 114 may be part of the core 104, which may also include a first sensor 132 and a second sensor 134. The first sensor 132 and the second sensor 134 each may be a voltage sensor, a current sensor, a combination current and voltage sensor, or another type of sensor. As shown in FIG. 2, the first sensor 132 is a voltage sensor while the second sensor 134 includes a current sensor 136 and a voltage sensor 138. The first sensor 132 is disposed about the first conductor 112 while the second sensor 134 is disposed about the second conductor 114. Suitable signaling cable 140 couple the respective output of the first sensor 132 and the second sensor 134 from the device 100.

The core 104 may further include the vacuum interrupter 108. A flexible electrical coupling 142 couples a moving contact 144 of the vacuum interrupter 108 to the second conductor 114. The actuating rod 146 couples the moving contact 144 to an actuator (not depicted). The actuating rod 110 may include an insulated rod portion 148. The actuating rod 110 extends through an end plate 150 as does the cable 140. A stationary contact 154 of the vacuum interrupter 108 is coupled to the first conductor 112 by a fastener 156, such as a threaded fastener or other suitable attachment means. Similarly, a fastener 158 secures the flexible coupling 142 to the second conductor 114.

The core 104 may form a pre-assembly that is molded in situ within the housing 102. The core 104 may have a number of configurations based upon the desired final configuration of the device 100 and the intended current path for the device 100. The core 104 illustrated in FIGS. 1 and 2 is for the "Z" shaped current path circuit interrupter device 100. For a different device or different current path, the core 104 is accordingly alternatively configured. The core 104 need not include all of the herein described components. For example, the core 104 may alternatively consist only of the sensors 132 and 134 and cable 140 or the core 104 may consist of the sensors 132 and 132, cable 140 and first and second conductors 112 and 114 or the core 104 may consist of virtually any combination of sensors, conductors, cabling and the like. Configuration of the core may be based upon the intended application and corresponding required current path configuration of the finished device. Likewise, the configuration of the housing, including a common housing portion and additional, selectable housing portions may be based upon the intended application and corresponding current path configuration.

The housing 102 is geometrically configured to accept the core 104, and in that regard the housing 102 may include several common geometric features. The housing 102 may include a body portion 160. The body portion 160 may have a cylindrical, rectangular box or any suitable shape, and, as shown in FIG. 1, the housing 102 is formed to include a cavity 106 within which several of the device components are disposed. For the device 100, for example, disposed within the cavity 106 are the vacuum interrupter 108 and its associated mechanical and electrical coupling components. The vacuum interrupter 108 may be secured within the cavity 106 by potting material, such as silicone or another suitable material. First and second cylindrical formations 164 and 166 receive the first and second sensors 132 and 134, respectively. The body portion 160 may therefore be substantially the same for each different configuration of device. For the device 100 shown in FIG. 1, the housing 102 is molded to include an insulating boss 168 that receives the second conductor 114.

Figure 3:
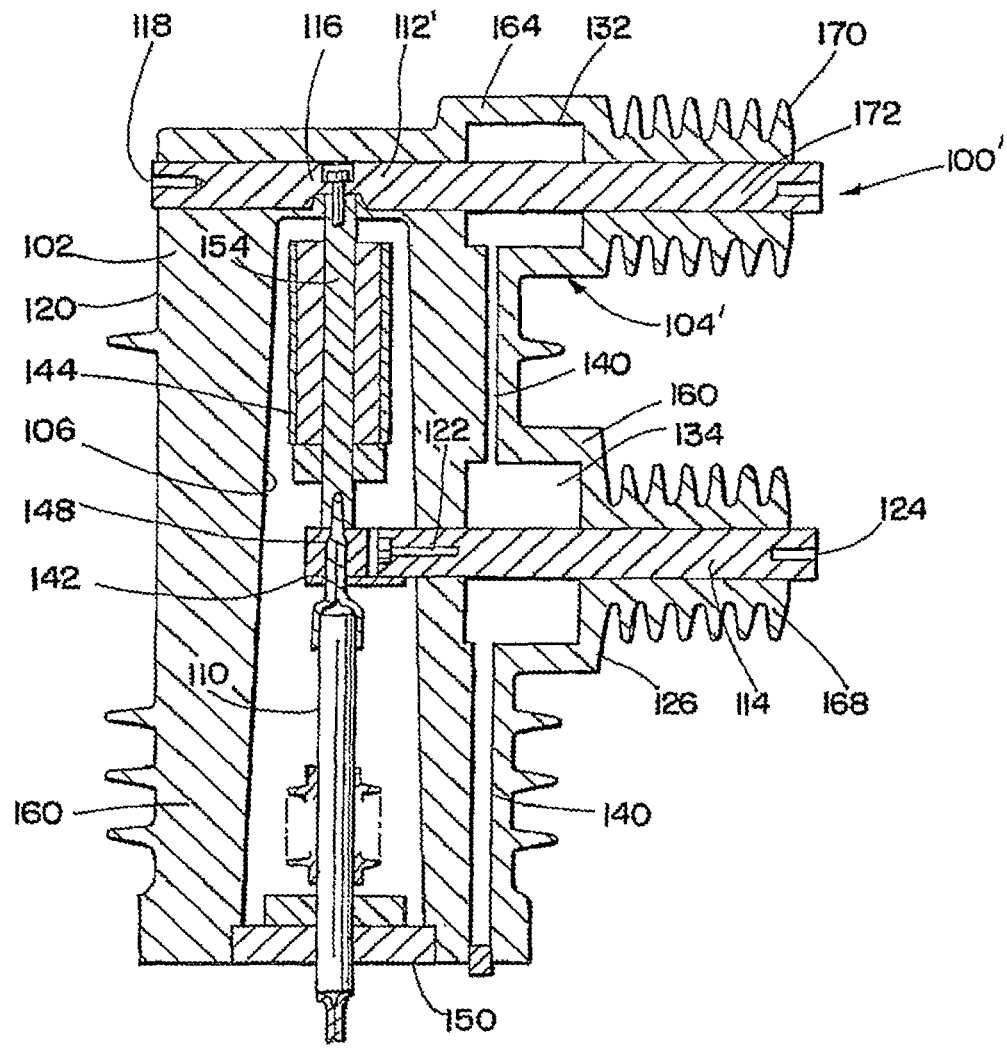
FIG. 3 is a cross-sectional view of an alternative configuration of the circuit interrupting device illustrated in FIG. 1.

Manufacture of devices as described herein, such as circuit interrupting devices, circuit breakers, reclosers, sensors, and the like is easily and economically provided. FIG. 3 illustrates a circuit interrupting device 100' that is of similar construction as the device 100, except that it is provided with an alternate electrical connection configuration and corresponding current path. Reference numerals are repeated in FIG. 3 for elements of the device 100' that are the same as those illustrated in connection with the device 100. Modified elements are indicated with a primed reference numeral, such as device 100 and device 100'. New or substantially different elements are identified with a unique reference numeral.

While the device 100 provides a "Z" shaped current path, the device 100' is configured to have "C" or "U" shaped current path, depending on the orientation of the device 100'. Herein it is referred to as "C" shaped based on the orientation the device 100' as shown in FIG. 3. The first conductor 112' is modified to extend farther through the sensor 132. The housing 102 is molded to include an insulating boss 170 surrounding the extended portion 172 of the first conductor 112'. The device 100' is otherwise the same as the device 100. For example, the core 104' is the same except that the first conductor 112' includes the extended portion 172. The housing 102' is the same except that it is molded to include the insulating boss 170. The first conductor 112' retains the first tap 118 external to the housing 102' on the first side 120.

Figure 4:
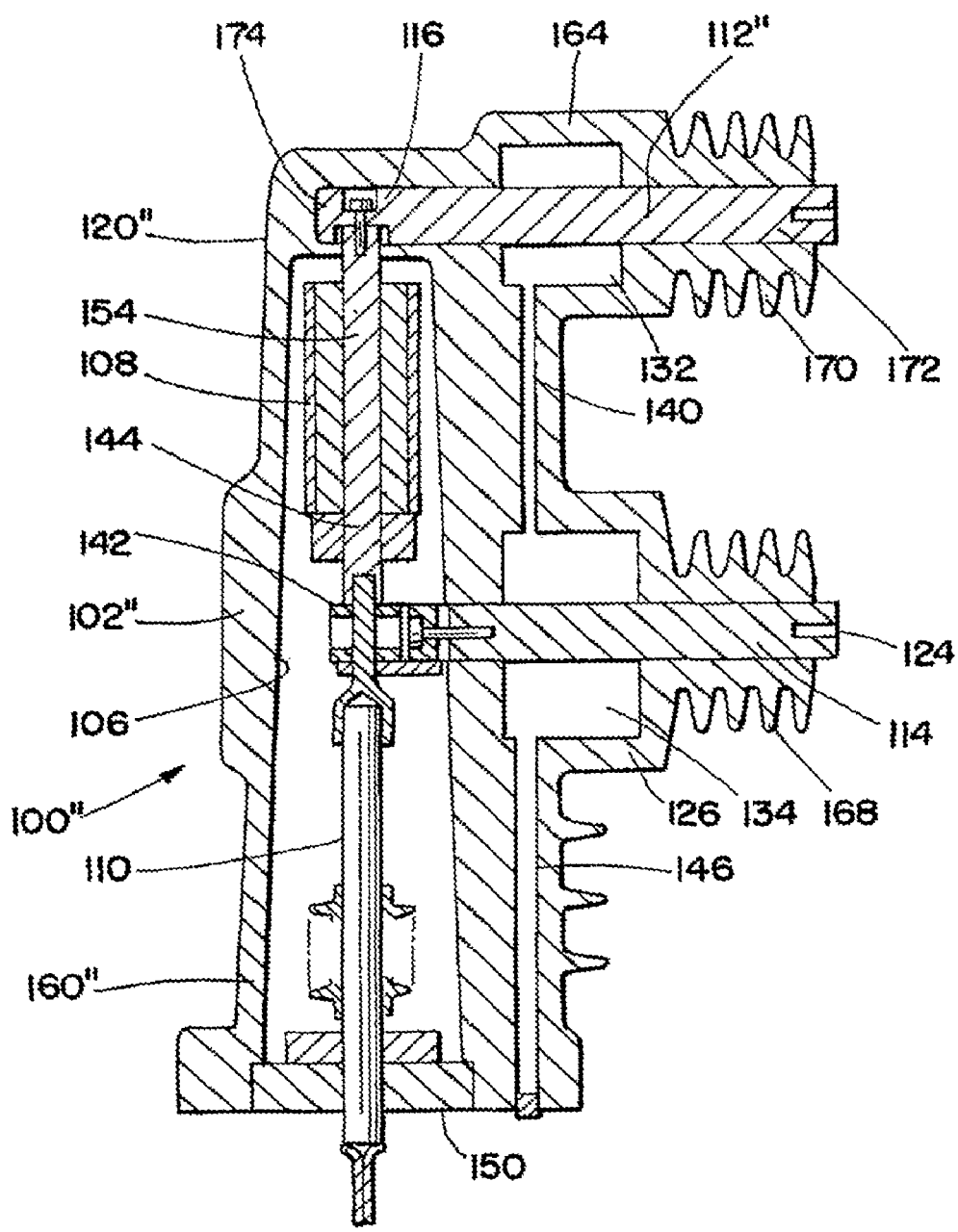
FIG. 4 is a cross-sectional view of an alternative configuration of the circuit interrupting device illustrated in FIG. 1.

FIG. 4 illustrates a circuit interrupting device 100" that is of similar construction as the devices 100 and 100', except that it is provided with yet another alternate electrical connection configuration. Reference numerals are repeated in FIG. 4 for elements of the device 100" that are the same as those illustrated in connection with the device 100. Modified elements are indicated with a double primed reference numeral, such as device 100 and device 100". New or substantially different elements are identified with a unique reference numeral.

The device 100" is configured to have "C" or "U" shaped current path similar to the device 100'. However, the first tap 118 is eliminated, and the housing 102" is modified in that that first side 120 is rounded. Of course, the housing 102" need not be modified except to enclose the opening for the first tap 118; however, such an arrangement would potentially require additional molding material. The first conductor 112" includes the portion 172 that extends through the sensor 132 and the insulating boss 170. A second end 174 of the first conductor 112" is truncated at the first tap 116 for connecting the first conductor 112" to the vacuum interrupter 108. The device 100" is otherwise the same as the device 100'. For example, the core 104" is the same except that the first conductor 112' is truncated at the first tap 116. The housing 102" is the same except that the first side 120" is reduced in size and the first tap 118 is eliminated.

Figure 5:
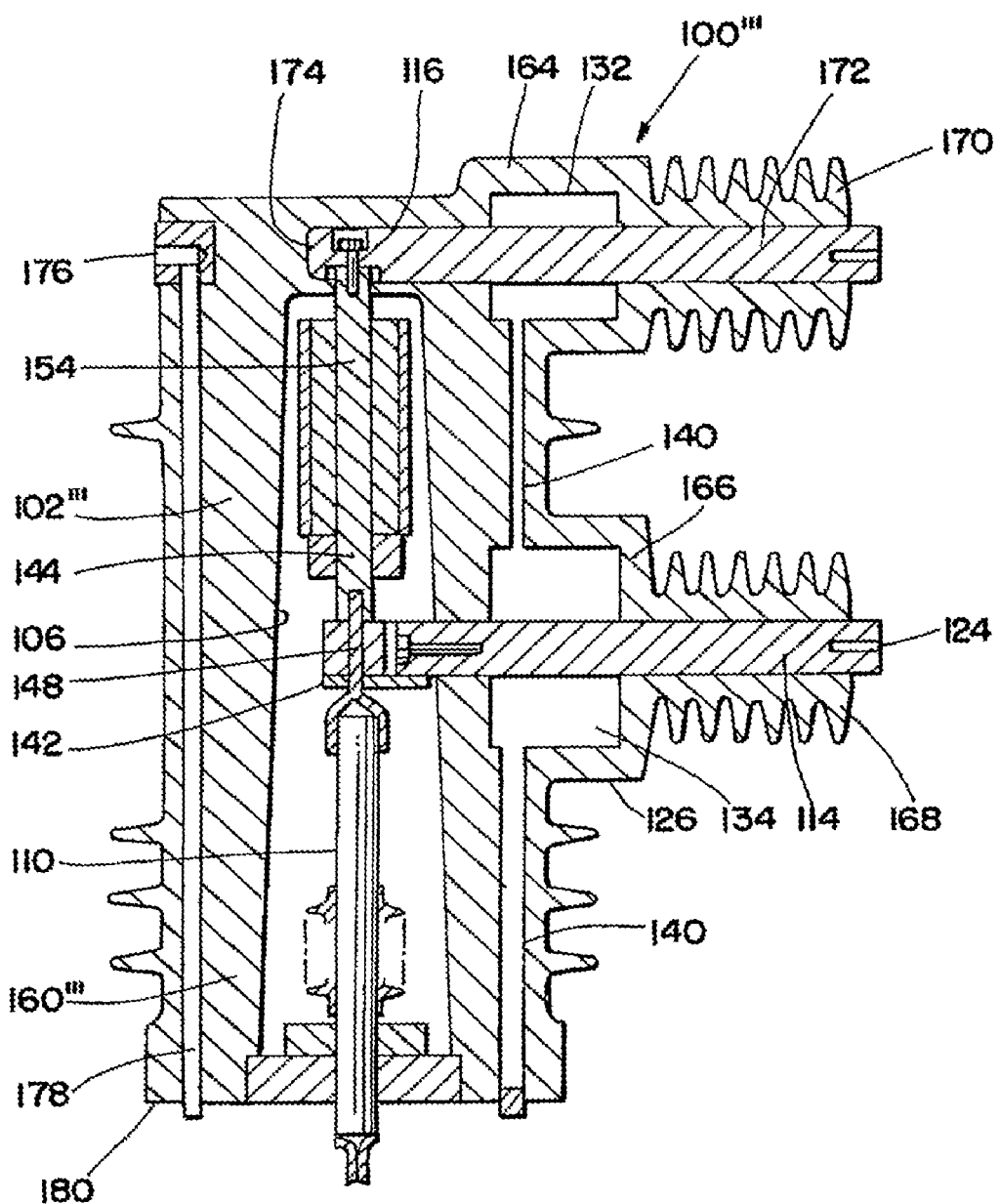
FIG. 5 is a cross-sectional view of an alternative configuration of the circuit interrupting device illustrated in FIG. 1.

FIG. 5 illustrates a circuit interrupting device 100''' that is of similar construction as the device 100, except that it is provided with an alternate electrical connection configuration. Reference numerals are repeated in FIG. 5 for elements of the device 100''' that are the same as those illustrated in connection with the devices 100, 100' and 100". Modified elements are indicated with a triple primed reference numerals, such as device 100 and device 100'''. New or substantially different elements are identified with a unique reference numeral.

While the device 100 provides a "Z" shaped current path, the device 100''' is configured to have "C" or "U" shaped current path, depending on the orientation of the device 100'.

We will continue to refer to it as "C" shaped as the device 100''' is shown in FIG. 5. The first conductor 112' is modified to include the portion 172 extending through the sensor 132. The housing 102''' is molded to include an insulating boss 170 surrounding the extended portion 172 of the first conductor 112'''. The first conductor 112''' is also truncated at the first tap 116. A ground tap 175 is provided having a tap 176 exposed on the second side 120''', where the second tap 118 was disposed. The ground tap 175 further includes conductor portion 178 extending through the housing 102''' to a base portion 180. The device 100''' is otherwise substantially similar to the device 100. For example, the core 104''' is substantially the same as the core 104'', and the housing 102''' is the same except that it is molded to include the insulating boss 170 and to incorporate the ground tap 175. The first conductor 112''' retains the opening where the first tap 118 was disposed, but not the opening is occupied by the tap 176.

Figure 6:
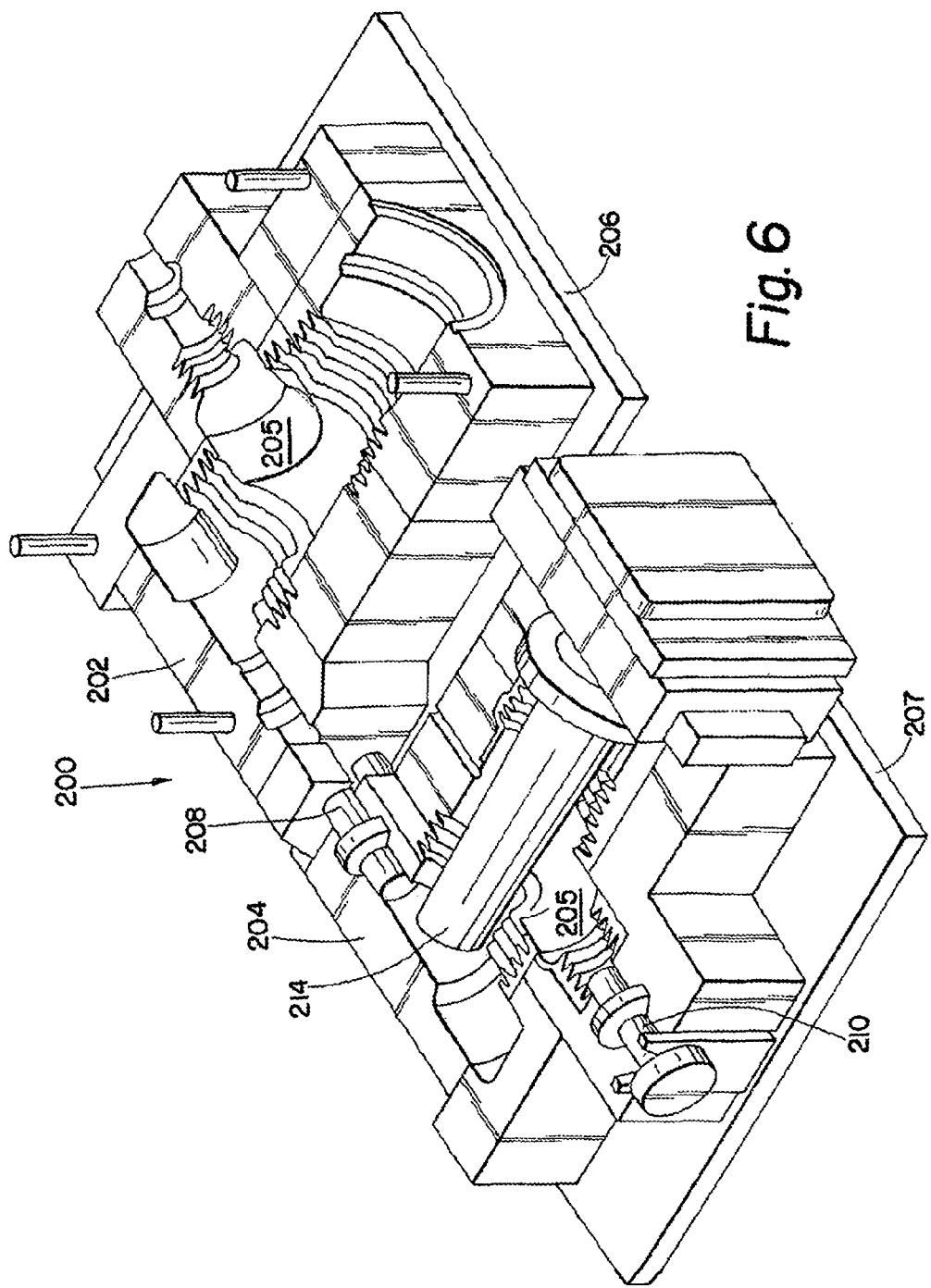
FIG. 6 is a perspective view of a mold assembly for making circuit interrupting devices.
Figure 7:
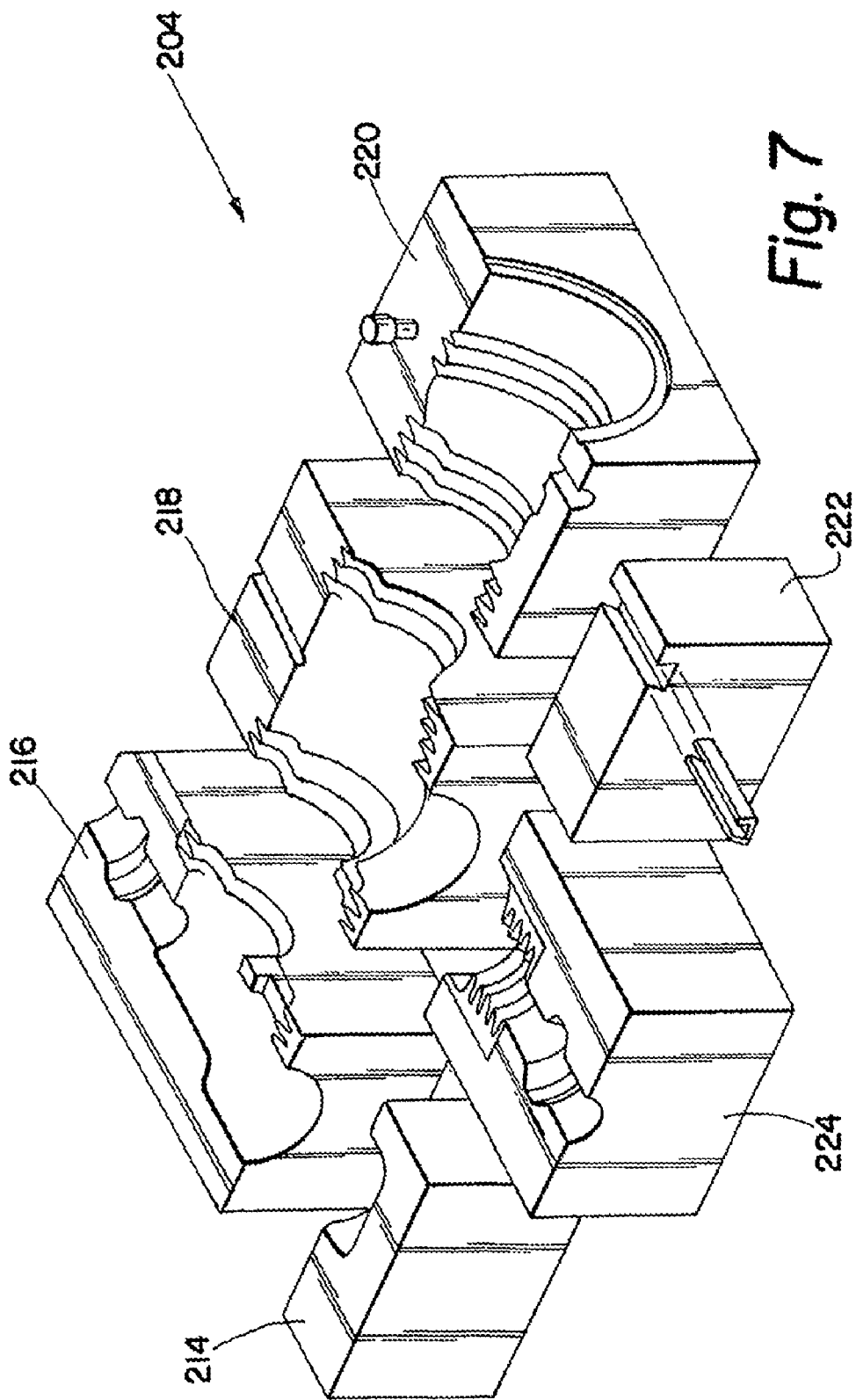
FIG. 7 is an exploded assembly view of a mold half of the mold assembly illustrated in FIG. 6.

In order to provide devices of various configurations, a manufacturing process is provided that utilizes a sectionalized mold tool. The sectionalized mold is easily configured and reconfigured to produce devices of differing configurations. In addition, core components are provided with a substantially common configuration. The commonized configuration of the core components allow simple, reliable adaptation to the variety of different device configurations to be manufactured. For example, a commonized core 104 is described above, and various device and current path configurations are depicted in FIGS. 1, 3-5. FIGS. 6 and 7 illustrate a sectionalized mold 200 that can be configured and reconfigured to easily produce a number of different devices utilizing the common core components.

The mold 200 includes a first mold half 202 and a second mold half 204 (FIG. 7 illustrates only the first mold half 202 in exploded assembly view). The first and second mold halves 202 and 204 are secured to respective bases 206 and 207 using various known location facilities. In addition, according to known processes, material is communicated into a mold cavity 205 defined by the mold halves 202 and 204.

The second mold half 204 includes a first core fixture 208 and a second core fixture 210. The first core fixture 208 and the second core fixture 210 fix, relative to the mold halves 202 and 204 and hence the mold cavity defined by the mold halves, the core assembly, such as core 104, within the mold 200. This permits the core assembly to be in situ molded within the housing of the device, such as depicted in FIGS. 1-5. The mold 200 may include an insert 214 defining a cavity within the molded housing that will contain components of the device. Alternatively, the core itself may include structure to define the cavity, and hence, become part of the finished device.

The mold halves 202 and 204 are formed of a plurality of mold sections. Mold sections 214, 216, 218, 220, 222 and 224 are illustrated in FIG. 7. By substituting mold sections, devices of different configurations may be manufactured. For example, to manufacture the device 100, the mold sections 214-224, as illustrated in FIG. 7 are used. To manufacture the device 100', the mold section 214 may be substituted with a mold section that defines the insulating bushing 170. Of course a corresponding section of the mold half 204 is also replaced. As can be seen, devices of numerous different configurations may be produced by substituting appropriate mold sections. The mold 200 is configured to receive and fix relative to the mold cavity the core assembly that may be commonly used for each of the devices.

FIGS. 8-13 illustrate a multiple or "gang disconnect" interrupter assembly 300. The assembly 300 may include several circuit interrupting devices 302, for example, and each may be an interrupter assembly 100. The multiple interrupter assembly 300 may be configured in numerous different ways including cantilever, outrigger, boom, vertical and the like. The assembly 300 illustrates one possible configuration. Moreover, as described herein, the ability to manually gang actuate the circuit interrupting devices, to provide visual indications of the state of the circuit interrupting device and to provide disconnect assembly lock out may be adapted to virtually any configuration of a multiple interrupter assembly.

Figure 8:
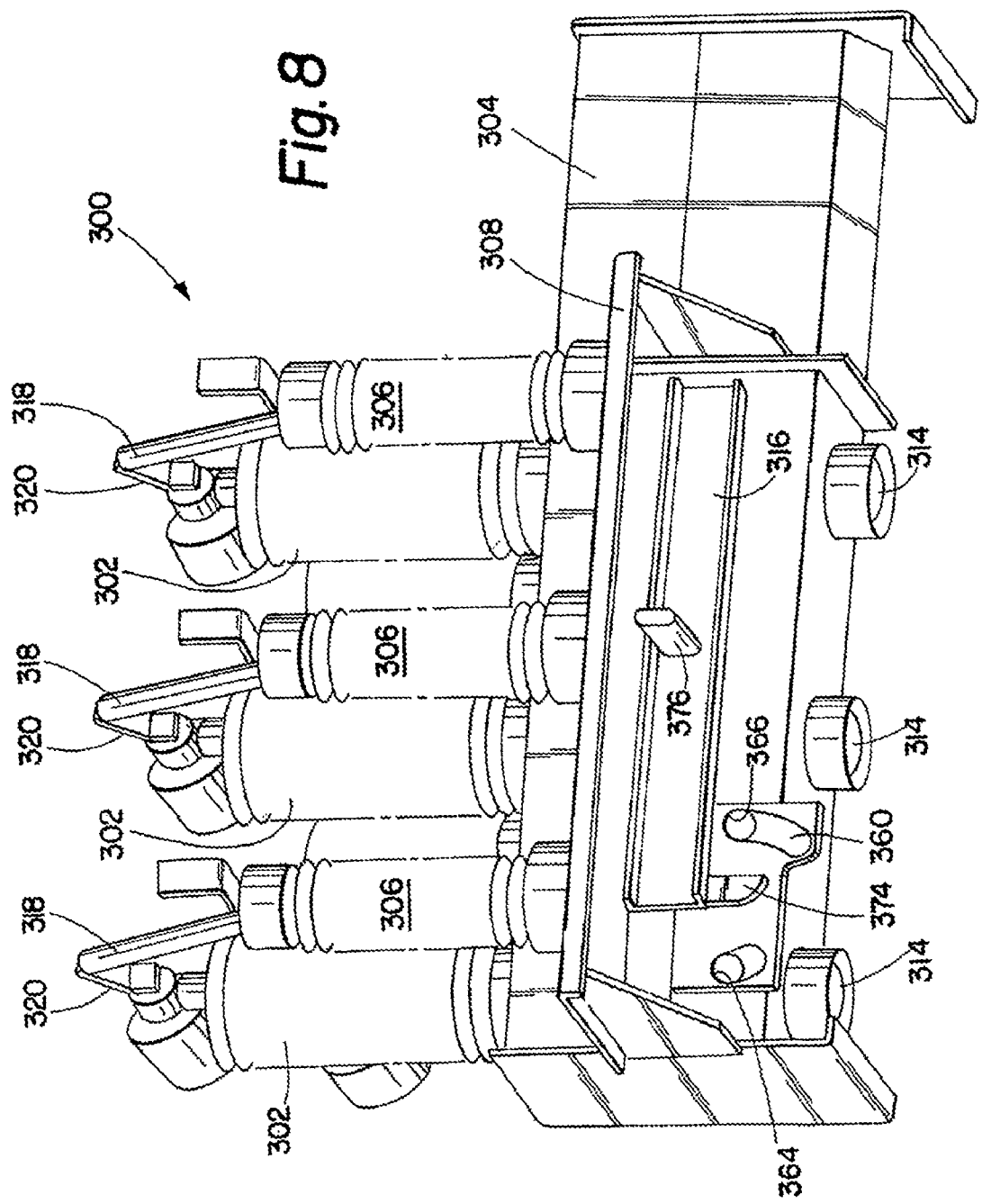
FIG. 8 is a perspective view of a multiple circuit interrupting device assembly.
Figure 9:
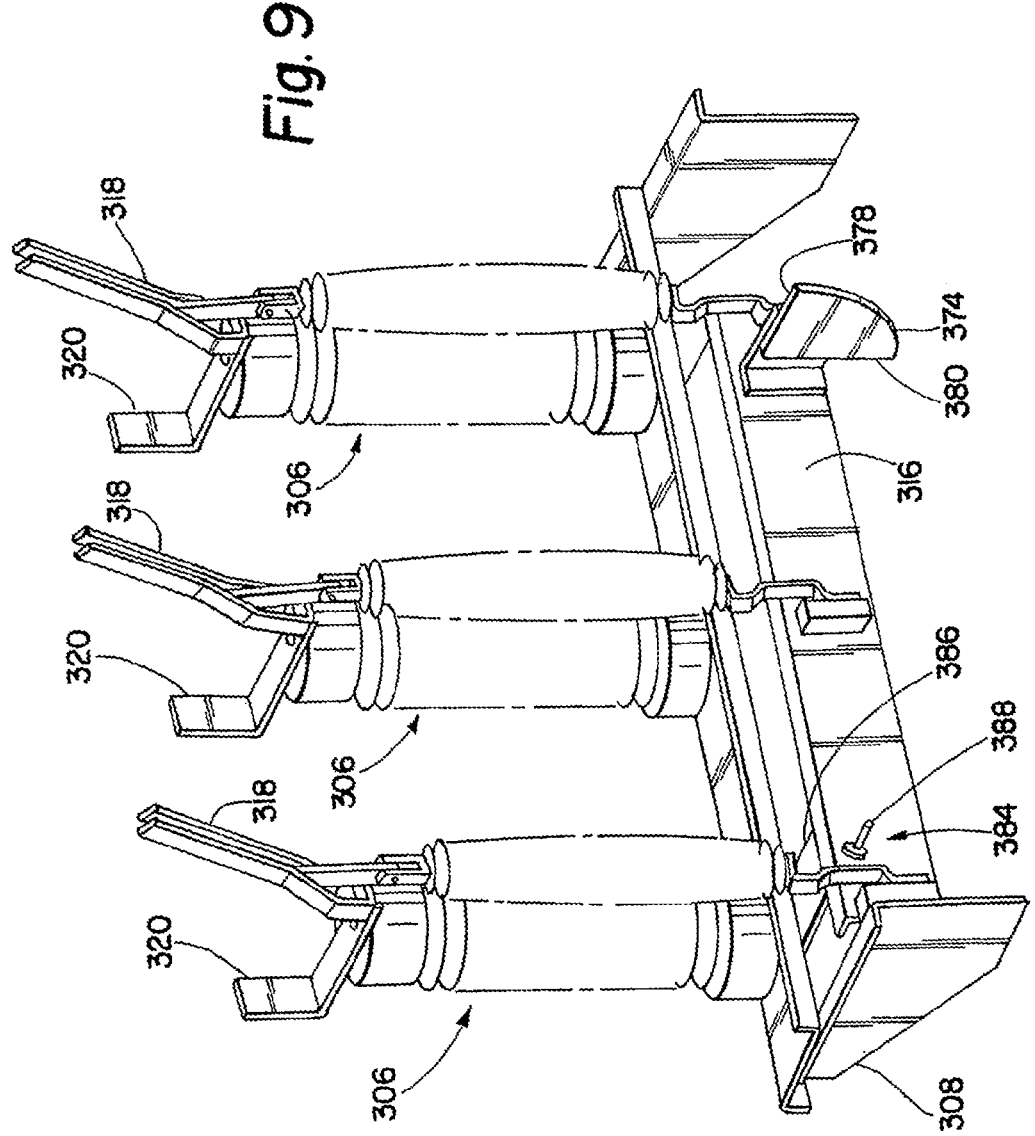
FIG. 9 is a perspective view of a disconnect assembly for the multiple circuit interrupting device assembly shown in FIG. 8.

Three circuit interrupting devices 302 are shown in FIG. 8, one each for each phase of a three phase power distribution system. The circuit interrupting devices 302 are secured to a base assembly 304. Each circuit interrupting devices 302 is associated with a disconnect assembly 306, with the disconnect assemblies being secured to a support member 308 secured to the base assembly 304. Corresponding to each circuit interrupting device 302 on a bottom surface of the base 304 is a transparent cap 314. The transparent cap 314 permits visual verification of the state of the corresponding circuit interrupting device 302 open or closed based upon visual inspection of the position of the circuit interrupting device actuator.

A disconnect member 316 is mounted for pivoting motion to the support member 308. The disconnect member 316 couples to each of the disconnect assemblies 306 so that pivoting movement of the disconnect member 316 moves all three disconnect assemblies from a connect state (FIG. 10) to a disconnect state (FIG. 11). In the connect state, blades 318 engage a contact 320 of the circuit interrupting device 302. In the disconnect state, the blade 318 is rotated away from and out of contact with the contact 320.

Figure 12:
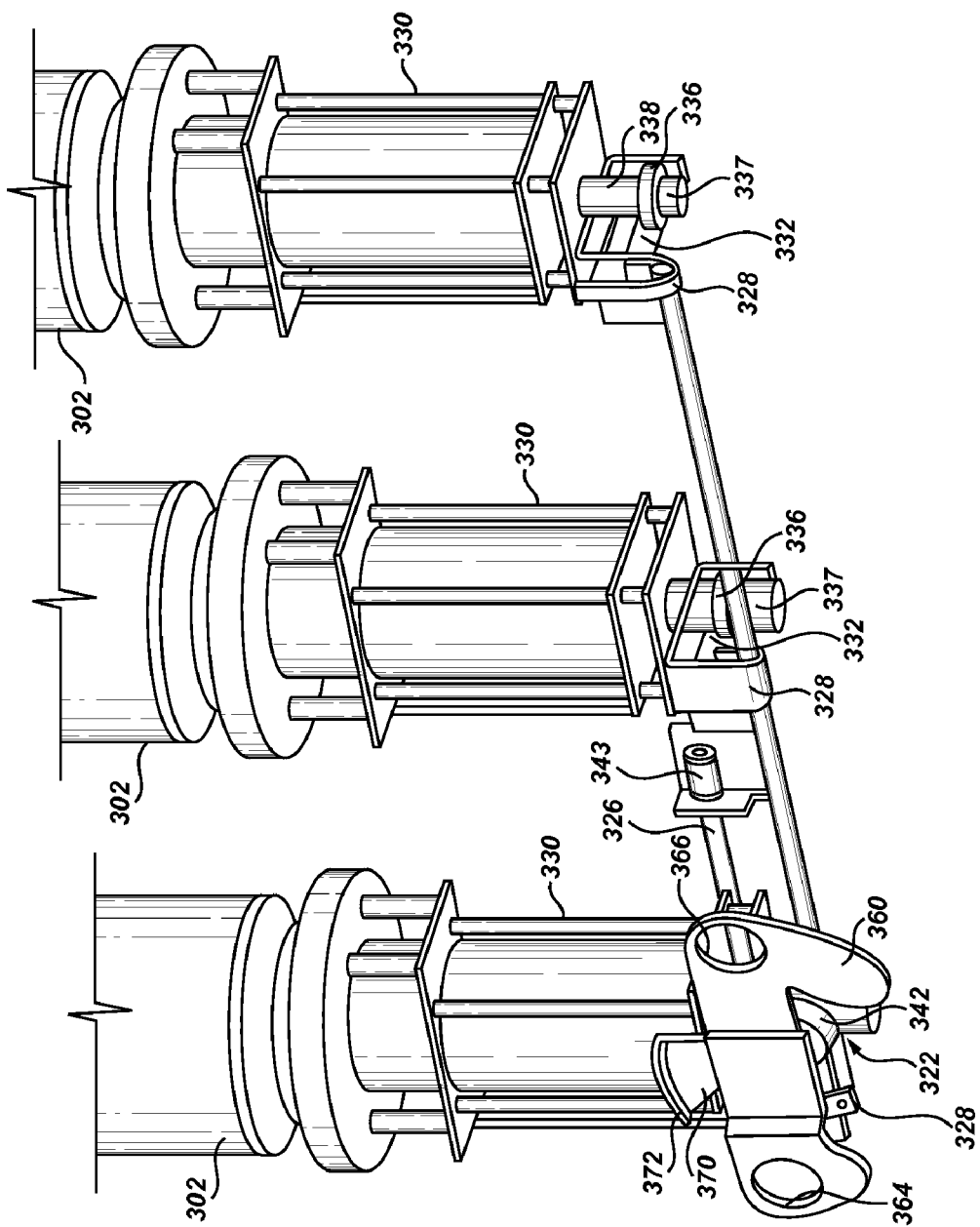
FIG. 12 is bottom front perspective view of the multiple circuit interrupting device assembly of FIG. 8 with a base removed to reveal a manual actuation and interlock mechanism.
Figure 13:
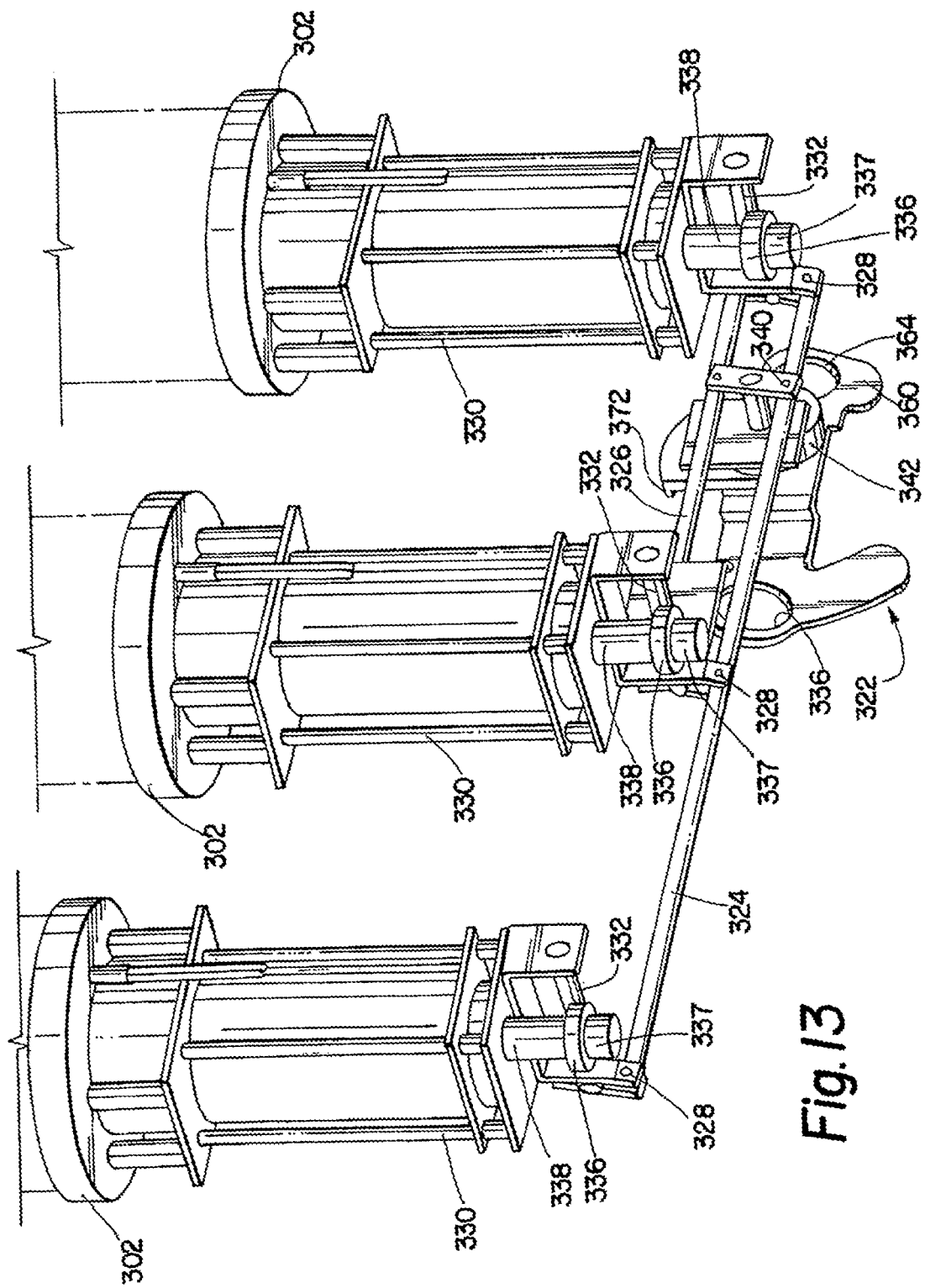
FIG. 13 is bottom rear perspective view of the multiple circuit interrupting device assembly of FIG. 8 with a base removed to reveal a manual operated gang actuation mechanism including an interlock assembly.
Figure 14:
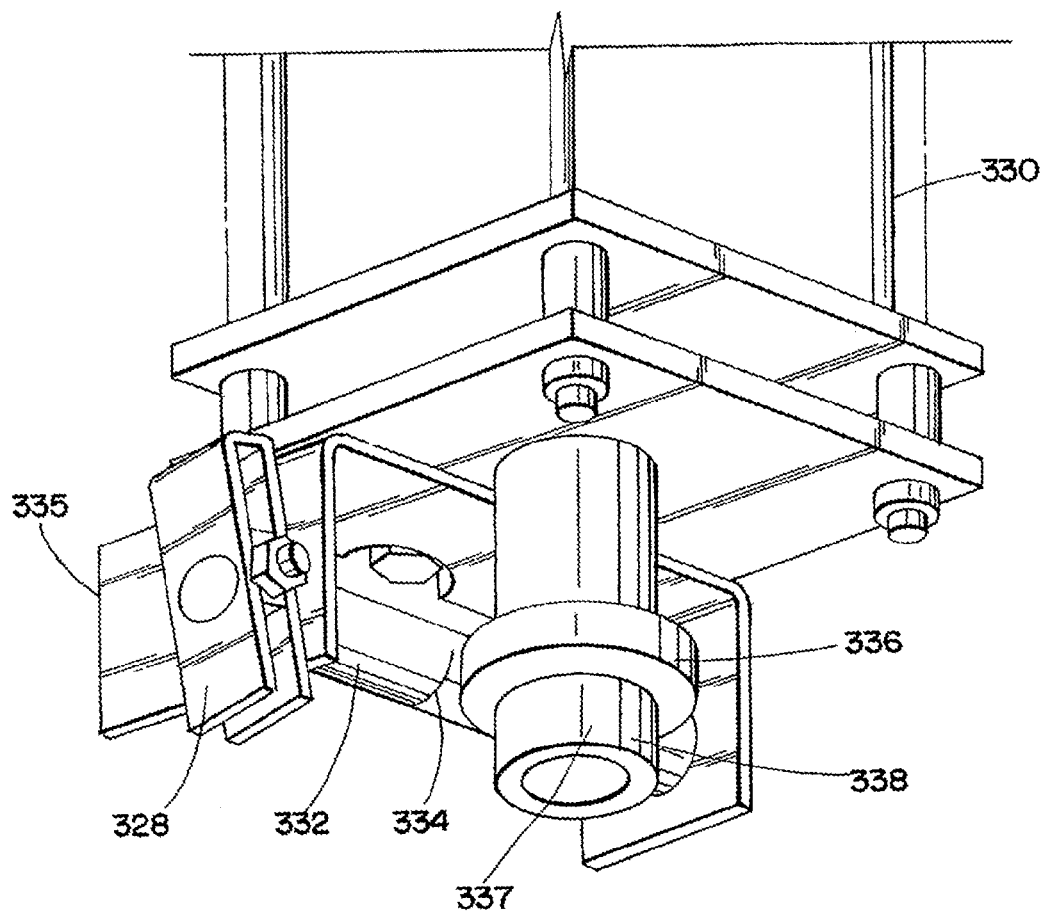
FIG. 14 is partial view of a circuit interrupting actuator and manual actuation mechanism.

Referring to FIGS. 12-14, the assembly 300 includes a manual operated gang actuation mechanism 322 for actuating the circuit interrupting devices from closed to open states. The mechanism 322 includes a pair of links 324 and 326 that couple to arms 328 secured to the actuator 330 associated with respective circuit interrupting devices 302. The arms 328 are secured to a pin 332 that is rotatably supported in a bracket 335 secured to the actuator 330. Each pin 332 is formed with a relief 334 that engages a collar 336 secured to a first end 337 of a rod 338 of the actuator 330. Rotation of the pin 332 causes the relief 334 to engage the collar 336 to move the rod 338, and hence to manually separate the contacts of the associated circuit interrupting device. A return spring 343 provides a restoring force to the link 326 to bias the mechanism 322 toward the interrupter closed state.

The pin 332 is caused to rotate as a result of movement of the links 324 and 326 responsive to rotation of lever 340 coupled to an input shaft assembly 342.

A lever plate 360 is also coupled to the input shaft assembly 342. The lever plate 360 includes a first aperture 364 and a second aperture 366. The apertures are sized to receive a hot stick for engaging the lever plate 360 to rotate the lever plate 360, and hence to cause rotation of the input shaft assembly 342.

Figure 10:
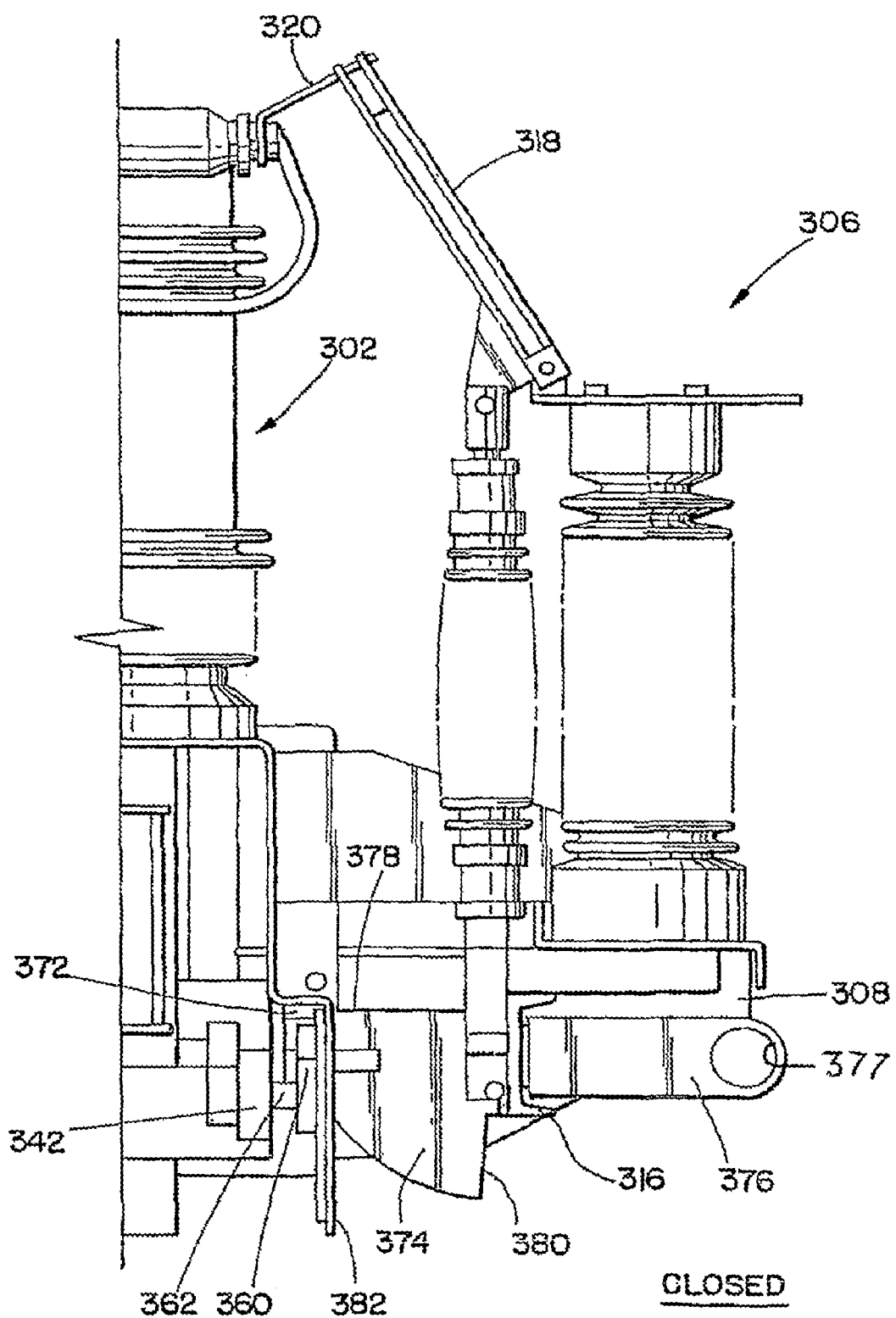
FIG. 10 is a side view of the multiple circuit interrupting device assembly of FIG. 8 with the disconnect assembly in a closed position or state.
Figure 11:
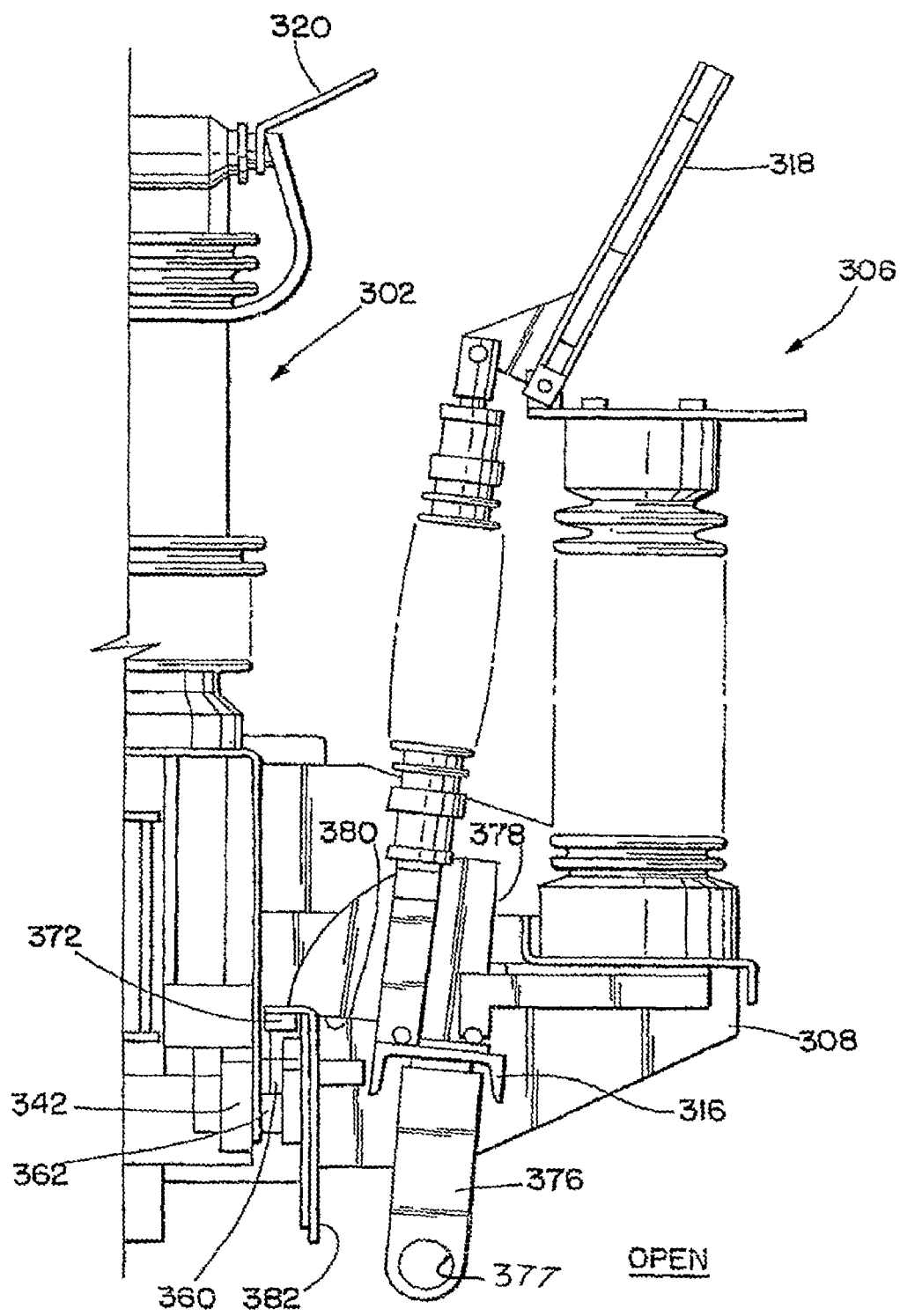
FIG. 11 is a side view of the multiple circuit interrupting device assembly of FIG. 8 with the disconnect assembly in an open position or state.
Figure 15:
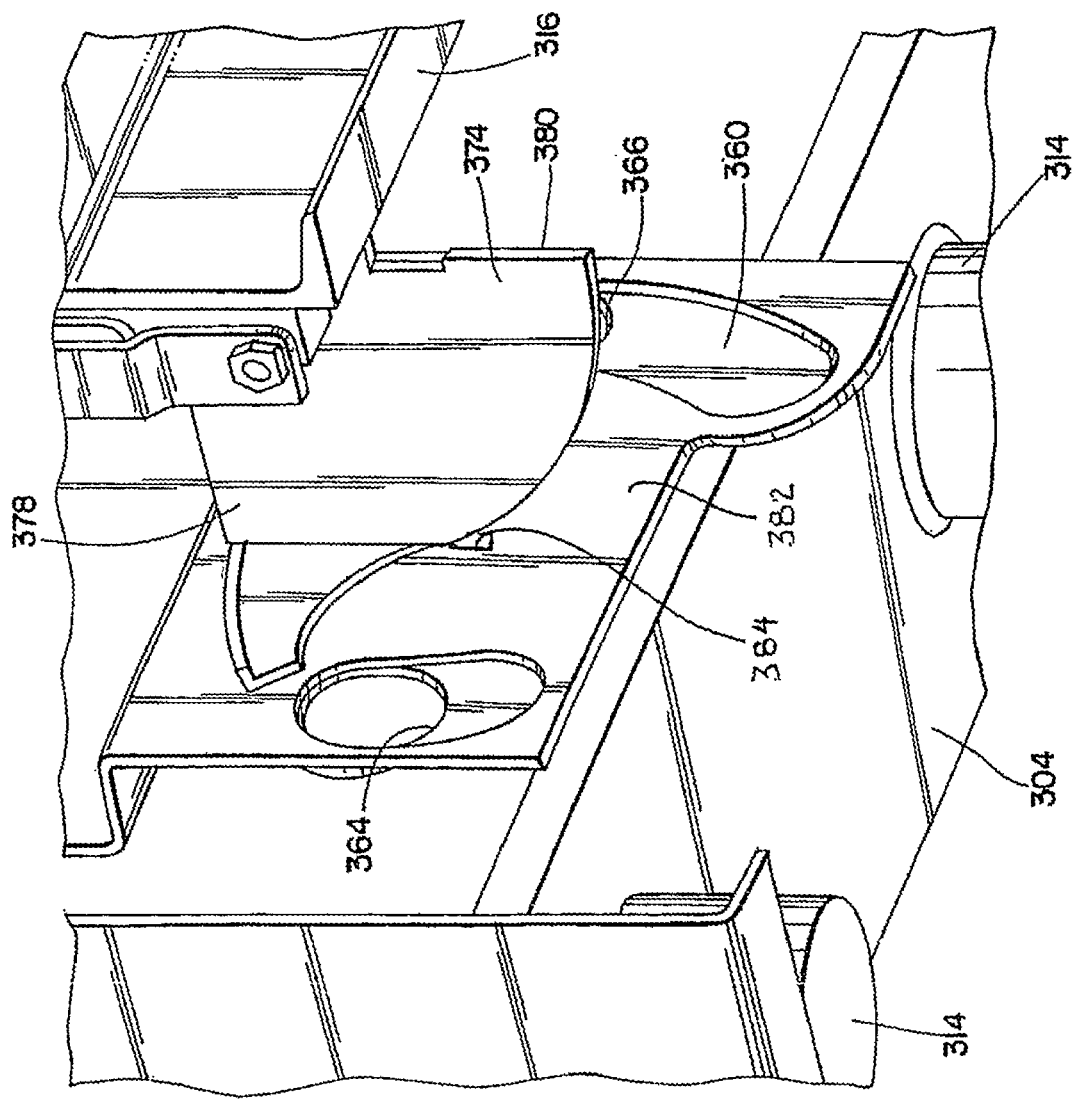
FIG. 15 is an enlarged perspective view of a manual operated gang actuation mechanism interlock assembly.

Referring particularly to FIGS. 10-11 and 15, the lever plate 360 is also formed with a locking member 370. In the embodiment illustrated in FIGS. 10-11 and 15, the locking member may be a flange 372. With the lever plate 360 in the lockout state, the flange 372 engages a cam member 374 secured to the disconnect member 316. A lever 376 is further coupled to the disconnect member 316. The lever 376 includes an aperture 377 that may be engaged by a hot stick to operate the disconnect assembly 306. The cam member 374 includes a first surface 378 and a second surface 380. With the disconnect assembly 306 in the closed state (FIG. 10) and the lever plate 360 in the lockout state, that is, the circuit interrupting device is either closed or reset and ready to close, the first surface 378 engages the flange 372. The engagement of the first surface 378 with the flange 372 prevents rotation of the lever 376 to open the disconnect assembly. Similarly, with the disconnect assembly 306 in the open state (FIG. 11) and the lever plate 360 in the lockout state, that is, the circuit interrupting device is either closed or reset and ready to close, the first surface 378 engages the flange 372. The engagement of the first surface 378 with the flange 372 prevents rotation of the lever 376 to close the disconnect assembly. When the lever plate 360 is in the disconnect state, i.e., the circuit interrupting device 302 is open, either having been automatically or manually opened, the cam member 374 does not engage the flange 372 and the lever 376 and disconnect member 316 is free to rotate to either open or close the disconnect assembly 306. As shown in FIG. 15, a close out plate 382 may be provided, formed with a slot 384 through which the cam member 374 extends into the base 304 to engage the flange 372. A detent (not depicted) may be provided to hold the disconnect member 316 in the open position. The detent may include a spring secured to the support 308 that engages a pin 388 secured to the disconnect member 316 once the disconnect member 316 is positioned in the disconnect open position.

While the present disclosure is susceptible to various modifications and alternative forms, certain embodiments are shown by way of example in the drawings and the herein described embodiments. It will be understood, however, that this disclosure is not intended to limit the invention to the particular forms described, but to the contrary, the invention is intended to cover all modifications, alternatives, and equivalents defined by the appended claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Unless a claim element is defined by reciting the word "means" and a function without the recital of any structure, it is not intended that the scope of any claim element be interpreted based on the application of 35 U.S.C. §112, sixth paragraph.

We claim:

1. A method of making a circuit interrupting device comprising:
    configuring a mold assembly based upon a first intended current path for a first circuit interrupting device;
    using the mold assembly to form a first solid insulating housing;
    disposing a first conductor and a second conductor within the first solid insulating housing;
    coupling the first conductor and the second conductor with a fault interrupter to define the first intended current path;
    reconfiguring the mold assembly based upon a second intended current path for a second circuit interrupting device;
    using the mold assembly to form a second solid insulating housing;
    disposing a first conductor and a second conductor within the second solid insulating housing; and
    coupling the first conductor and the second conductor with a fault interrupter to define the second intended current path.

2. The method of claim 1, wherein the mold assembly comprises a plurality of mold segments, and reconfiguring the mold assembly comprises reconfiguring the mold segments.

3. The method of claim 2, wherein a mold segment of the plurality of mold segments corresponds to a common housing feature.

4. The method of claim 1, wherein comprising providing a core assembly, and molding the core assembly within the solid insulating housing.

5. The method of claim 4, wherein the core assembly comprises a sensor.

6. The method of claim 4, wherein the core assembly comprises the first and second conductors.

7. The method of claim 1, wherein the first intended current path comprises a "Z" or "N" shape.

8. The method of claim 1, wherein the second intended current path comprises a "C" or "U" shape.

9. The method of claim 1, comprising providing a tap coupled to one of the first conductor and the second conductor, the tap being molded within the solid insulating housing.

10. The method of claim 1, comprising providing a ground tap molded within the solid insulating housing.

* * * * *